United States Patent [19]

Weber

[11] Patent Number: 4,653,687
[45] Date of Patent: Mar. 31, 1987

[54] MIXING VALVE

[75] Inventor: Kent Weber, Rockford, Ill.

[73] Assignee: Sundstrand Corporation, Rockford, Ill.

[21] Appl. No.: 761,484

[22] Filed: Aug. 1, 1985

[51] Int. Cl.⁴ .................... G05D 23/06; F16K 11/044
[52] U.S. Cl. .................. 236/12.11; 236/12.2; 236/12.21; 137/625.4; 137/625.5
[58] Field of Search ............ 137/625.64, 625.66, 137/625.61, 625.5, 114, 625.4, 88, 91, 92, 93, 82, 83; 251/30.01; 236/12.22, 12.11, 12.1, 12.12, 12.2, 12.21; 92/117

[56] References Cited

U.S. PATENT DOCUMENTS

| 1,819,045 | 8/1931 | Snediker | 236/12.11 |
| 1,901,268 | 3/1933 | Snediker | 236/12.11 |
| 2,550,907 | 5/1951 | Brown | 236/12.11 |
| 2,775,254 | 12/1956 | Stanbury | 137/82 |
| 3,182,561 | 5/1965 | Arnett | 91/364 |
| 3,221,760 | 12/1965 | Buchanan | 137/82 |
| 3,380,657 | 4/1968 | Meier | 236/12.2 |
| 3,447,555 | 6/1969 | Jenney | 137/553 |
| 3,561,481 | 2/1971 | Taplin | 137/625.4 |
| 3,561,484 | 2/1971 | Taplin | 137/625.4 |
| 3,592,234 | 7/1971 | Baltus | 137/625.62 |
| 3,712,339 | 1/1973 | Bartholomaus et al. | 137/625.62 |
| 3,817,150 | 6/1974 | Cox | 91/186 |
| 4,005,733 | 2/1977 | Riddel | 137/625.4 |

FOREIGN PATENT DOCUMENTS 2110839 9/1972 Fed. Rep. of Germany .
2056627 8/1980 United Kingdom ............ 236/12.11

Primary Examiner—Martin P. Schwadron
Assistant Examiner—John S. Starsiak, Jr.
Attorney, Agent, or Firm—Wood, Dalton, Phillips, Mason & Rowe

[57] ABSTRACT

To provide a thermal cooling system in applications having a pumped fluid cooling loop with stringent reliability requirements, a mixing valve has a housing defining a valve chamber provided with a pair of inlet openings and an outlet opening. A valve support is mounted to the housing and extends into the valve chamber between the inlet openings such that a valve member can be slidably mounted on the support within the chamber for movement between the inlet openings. Additionally, the position of the valve member can be controlled relative to the inlet openings for controlling the flow from each of the inlet openings which can pass through the outlet opening to maintain a predetermined temperature downstream of the outlet opening.

14 Claims, 1 Drawing Figure

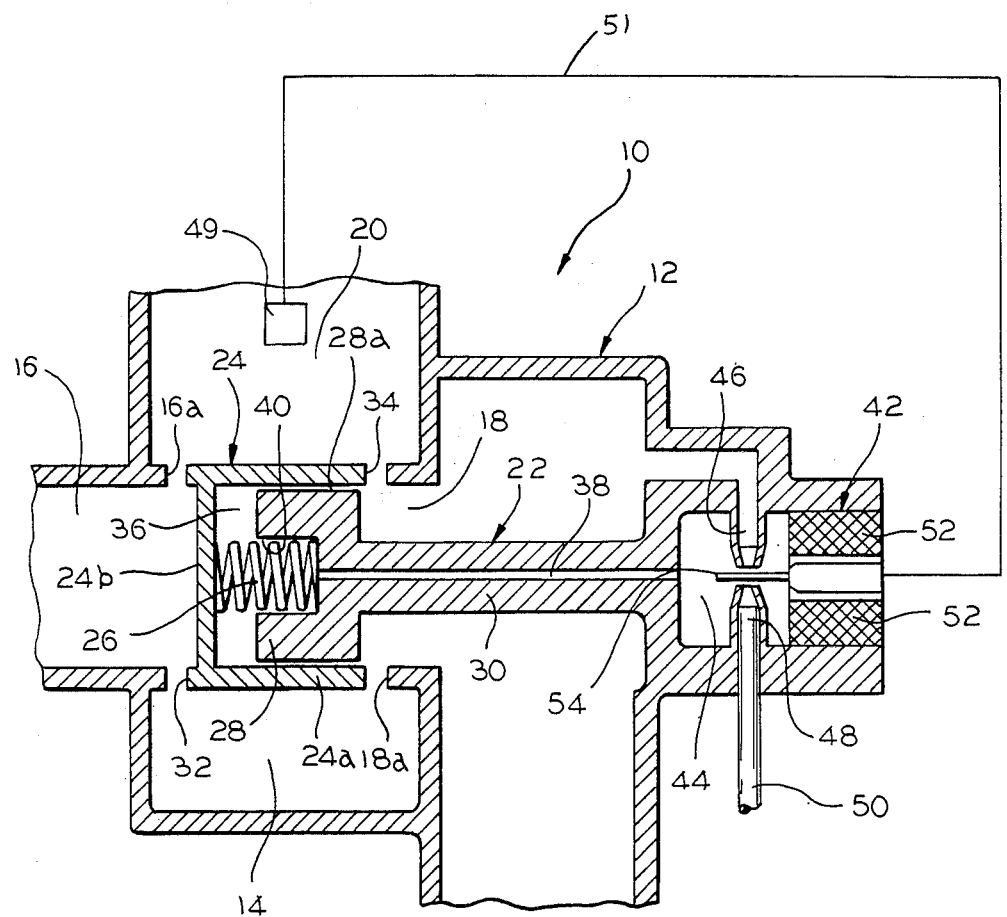

4,653,687

MIXING VALVE

FIELD OF THE INVENTION

This invention relates to a mixing valve, and more specifically, to a temperature control bypass valve for a fluid in a fluid circulation system.

BACKGROUND OF THE INVENTION

Mixing valves for a variety of applications have been known for many years. One application is that of controlling the temperature of a fluid in a fluid circulation system by combining the flow of the same fluid at different temperatures to provide the fluid at a desired temperature for use downstream thereof. Most frequently, this is accomplished by means of complicated valves having a number of moving parts.

In one application, a mixing valve is utilized in a space qualified thermal cooling system designed for use in space stations where it must serve as a temperature control bypass valve in a pumped fluid cooling loop. Because of the sensitivity of equipment to be cooled in such an environment, coupled with the extraordinarily expensive nature of such equipment and the difficulty of repair, the reliability of the thermal cooling system is a critical factor.

In practice, the failure of valves in space-related systems has been a serious problem. Conventional spool or poppet valves having numerous moving and sliding parts such as those disclosed in Cox U.S. Pat. No. 3,817,150, issued June 18, 1974, Bartholomans et al. U.S. Pat. No. 3,712,339, issued Jan. 23, 1973, and Baltus U.S. Pat. No. 3,.592,234, issued July 13, 1971, are all too complex to meet the stringent reliability requirements for space qualified thermal cooling systems since they can easily stick due to the close tolerances of the relatively movable parts and the fact that they do not have sufficient force to overcome any impediment to normal movement. Moreover, it has been found that conventional spool or poppet valves can wear over time leading to failure.

Among other attempts to provide valves for various applications and those disclosed in U.S. Pat. Nos. 4,005,733; 3,182,561; 2,775,254; and German Pat. No. 2,110,839.

While overcoming problems of this type, it is desirable to provide a mixing valve having a minimum of moving or sliding parts. It is also desirable to provide a mixing valve suitable for use in a thermal cooling system in the form of a utility cooling bus for use in space stations wherein individual pieces of equipment and experiments can be plugged into the thermal bus as needed. Further, it is desirable to provide a mixing valve having loose tolerances with balanced pressures, sufficient force to overcome sticking, and the ability to be repaired externally of the fluid cooling loop.

The present invention is directed to overcoming the above stated problems and accomplishing the stated objects.

SUMMARY OF THE INVENTION

It is the principal object of the present invention to provide a new and improved mixing valve. More specifically, it is an object of the invention to provide a temperature control bypass valve for a fluid in a fluid circulation system. It is likewise an object of the invention to provide a mixing valve having a unique construction adapted for space-related applications.

An exemplary embodiment of the invention achieves the foregoing objects in a mixing valve having a housing defining a valve chamber provided with a pair of inlet openings and an outlet opening. A valve support is mounted to the housing and extends into the valve chamber between the inlet openings such that a valve member can be slidably mounted on the support within the chamber for movement between the inlet openings. Additionally, the mixing valve includes means for controlling the position of the valve member relative to the inlet openings for controlling the flow from each of the inlet openings which can pass through the outlet opening.

In the exemplary embodiment, the inlet openings are disposed in substantial axial alignment with oppositely facing valve seats thereabout. The valve support is rigidly mounted to the housing so as to extend axially through one of the inlet openings to a point intermediate the oppositely facing valve seats. The valve support preferably comprises a piston disposed in a fixed position together with an axially extending stem integrally associated with the piston. With this arrangement, the valve member is slidably mounted for axial movement on the piston between the inlet openings and has oppositely facing valve surfaces conforming to and adapted to engage the oppositely facing valve seats.

In a preferred embodiment, the inlet openings carry a fluid at different temperatures for mixing to provide the fluid at a predetermined temperature downstream of the outlet opening. This is accomplished by providing an actuation chamber between the piston and the valve member together with means for biasing the valve member toward one of the inlet openings. Preferably, the biasing means includes a spring seated on the piston in the actuation chamber together with a fluid pressure signal selectively supplied to the actuation chamber to act against the valve member.

With this construction, a flapper nozzle servovalve is provided to control the fluid pressure signal acting against the valve member in response to the fluid temperature downstream of the outlet opening. The flapper nozzle servovalve preferably includes a central control port communicating with a fluid conduit extending through the stem to the actuation chamber and having an inlet nozzle and an outlet nozzle where the inlet nozzle communicates with fluid carried to one of the inlet openings and the outlet nozzle communicates with a drain line. While the flapper nozzle servovalve has a flapper extending into the central control port between the inlet and outlet nozzles, it preferably utilizes a replaceable dry coil accessible externally of the housing in order to facilitate repair of the mixing valve.

To provide generally balanced pressures on the valve member, the fluid passing through one of the inlet openings acts against the valve member opposite the direction of biasing of the spring and fluid pressure signal.

To prevent sticking of the valve member on the piston, the valve member is formed of a self-lubricating material and is dimensioned slightly larger than the piston.

To facilitate sliding movement of the valve member on the piston, the fluid in the actuation chamber is able to provide additional lubrication in the form of slight leakage between the valve member and the piston.

Other objects and advantages will become apparent from the following specification taken in connection with the accompanying drawings.

DESCRIPTION OF THE DRAWING

The drawing is a cross-sectional view of a mixing valve in accordance with the present invention.

DESCRIPTION OF THE PREFERRED EMBODIMENT

An exemplary embodiment of a mixing valve in accordance with the invention is illustrated in the drawing. The mixing valve 10 includes a housing 12 defining a valve chamber 14 having a pair of inlet openings 16 and 18 and an outlet opening 20. A valve support 22 is mounted to the housing 12 and extends into the valve chamber 14 between the inlet openings 16 and 18, and a valve member 24 is slidably mounted on the valve support 22 within the valve chamber 14 for movement between the inlet openings 16 and 18. The mixing valve 10 also includes means for controlling the position of the valve member 24 relative to the inlet openings 16 and 18. As will be described hereinafter, the position controlling means includes means for biasing the valve member 24 toward one of the inlet openings 16 such as the spring 26.

As shown, the inlet openings 16 and 18 are disposed in substantial axial alignment with oppositely facing valve seats 16a and 18a thereabout. It will be appreciated that the inlet openings 16 and 18 are particularly well adapted for carrying a fluid at different temperatures for mixing to provide the fluid at a predetermined temperature downstream of the outlet opening 20. As a result, the mixing valve 10 is well suited for use in a fluid circulation system as a temperature control bypass valve.

In accordance with the present invention, the valve support 22 is rigidly mounted to the housing 12 and extends axially through one of the inlet openings 18 to a point intermediate the oppositely facing valve seats 16a and 18a. It will be seen that, in the preferred embodiment, the valve support 22 comprises a piston 28 disposed in a fixed position at the intermediate point described together with an axially extending stem 30 integrally associated with the piston 28 and rigidly mounted to the housing 12 to maintain the piston in the fixed position illustrated. The valve member 24 is slidably mounted on the piston 28 for axial movement between the inlet openings 16 and 18 and has oppositely facing valve surfaces 32 and 34 conforming to and adapted to engage the oppositely facing valve seats 16a and 18a, respectively.

As previously mentioned, the means for controlling the position of the valve member 24 includes biasing means such as the spring 26. It will also be seen that an actuation chamber 36 is provided between the piston 28 and the valve member 24 so that the biasing means may further include a fluid pressure signal supplied to the actuation chamber 36 through a fluid conduit 38 extending through the stem 30 to the actuation chamber 36. With this construction, the fluid pressure signal is adapted to act against the valve member 24 in the same direction as the spring 26 seated on the piston 28 in a spring receiving bore or recess 40.

For purposes of controlling the fluid pressure signal acting against the valve member 24, a flapper nozzle servovalve 42 is provided. The flapper nozzle servovalve 42 extends into a central control port 44 communicating with the fluid conduit 38 and having an inlet nozzle 46 and an outlet nozzle 48 where the inlet nozzle 46 communicates with fluid carried to one of the inlet openings 18 and the outlet nozzle 48 communicates with a drain line 50. Additionally, the flapper nozzle servovalve 42 includes one or more replaceable dry coils 52 accessible externally of the housing 12 and a flapper 54 extending into the central control port 44 between the inlet and outlet nozzles 46 and 48.

As previously mentioned, the spring 26 is seated in the bore or recess 40 of the piston 28 in the actuation chamber 36 to act against the valve member 24 which faces in the direction of the inlet opening 16. It will be appreciated that both the spring 26 and the fluid pressure signal carried through the fluid conduit 38 act against the valve member 24 toward the inlet opening 16 and away from the inlet opening 18. Accordingly, fluid passing through the inlet opening 16 will act against the valve member 24 opposite the direction of biasing of the spring 26 and the fluid pressure signal carried through the fluid conduit 38.

When utilizing the mixing valve 10 to control temperature or any other fluid condition that can be sensed, the means for controlling the position of the valve member 24 relative to the inlet openings 16 and 18 makes it possible to select and maintain a predetermined temperature or condition downstream of the outlet opening 20 through the operation of a temperature responsive control means such as a conventional temperature sensor or thermostatic control 49 operatively connected in conventional fashion to the flapper nozzle servo valve 42 through a signal carrying wire 51. This is accomplished since the position of the oppositely facing valve surfaces 32 and 34 are controlled relative to the oppositely facing valve seats 16a and 18a. As previously suggested, the position of the valve member 24 is controlled by balancing the pressure of fluid passing through the inlet opening 16 and acting against the valve member 24 with the combined force of the spring 26 and the fluid pressure signal carried through the fluid conduit 38 and also acting against the valve member 24 but in the opposite direction.

As will be appreciated, the inlet openings 16 and 18, the valve member 24, and the piston 28 are all preferably generally cylindrical in shape. It is also desirable for the valve member 24 to be dimensioned slightly larger than the piston 28 so that fluid in the actuation chamber 36 is able to seep or leak between the generally cylindrical wall 24a of the valve member 24 and the generally cylindrical outer surface 28a of the piston 28 to provide lubrication therebetween. Moreover, the valve member 24 and/or the piston 28 can advantageously be formed of a self-lubricating material such as a suitable plastic.

In operation, the pressure or force on opposite sides of the valve face 24b of the valve member 24 is essentially balanced. With the inlet opening 16 carrying cold fluid from a heat exchanger (not shown) and the inlet opening 18 carrying hot fluid directly from equipment to be cooled (not shown) and, thus, by-passing the heat exchanger, the cold and hot fluids pass through the symmetrical oppositely facing valve seats 16a and 18a where they are mixed while leaving the valve 10 via the centrally located outlet opening 20. In order to vary the mixture, the flapper nozzle servovalve is operable in response to the temperature of the fluid downstream of the outlet opening 20.

As shown, the flapper nozzle servovalve 42 is supplied with hot fluid through the inlet nozzle 46 which fills the central control port 44. This, in turn, provides the fluid pressure signal carried through the fluid conduit 38 to the actuation chamber 36. In addition, the outlet nozzle 48 is connected to the inlet of the fluid circulation system pump through the drain line 50.

If the fluid temperature which is sensed downstream of the outlet opening 20 is in excess of the predetermined temperature, the flapper nozzle servovalve 42 will cause the flapper 54 to move toward the inlet nozzle 46. Since the inlet nozzle 46 will be closed and the outlet nozzle 48 will be open, fluid will flow from the actuation chamber 36, through the fluid conduit 38, into the central control port 44, through the outlet nozzle 48, and into the drain line 50. As a result, the valve member 24 will move toward the inlet opening 18 since the pressure of the fluid flowing through the inlet opening 16 which acts against the valve face 24b will exceed the oppositely directed biasing force of the spring 26, i.e., there will be a pressure differential across the valve face 24b tending to move the valve member 24 toward a position in which the valve surface 34 is in engagement with the valve seat 18a. As this occurs, there will be increased flow of cold fluid through the inlet opening 16 and into the outlet opening 20 as flow of hot fluid through the inlet opening 18 and into the outlet opening 20 decreases or entirely stops.

Conversely, if the fluid temperature being sensed downstream of the outlet opening 20 is below the predetermined temperature, the flapper nozzle servovalve will cause the flapper 54 to move toward the outlet nozzle 48. Since the outlet nozzle 48 will be closed and the inlet nozzle 46 will be open, fluid flowing through the inlet opening 18 will flow through the inlet nozzle 46, the control port 44, and the fluid conduit 38 to fill the actuation chamber 36 until the fluid pressure on both sides of the valve surface 24b is the same. At this point, the spring 26 will bias the valve member 24 toward the inlet opening 16 since the combined force of the spring 26 and the fluid pressure signal carried through the fluid conduit 38 will exceed the oppositely directed pressure of fluid flowing through the inlet opening 16, i.e., there will be a pressure differential across the valve face 24b tending to move the valve member 24 toward a position in which the valve surface 32 is in engagement with the valve seat 16a. As this occurs, there will be increased flow of hot fluid through the inlet opening 18 and into the outlet opening 28 as flow of cold fluid through the inlet opening 16 and into the outlet opening 20 decreases or entirely stops.

As will be appreciated, the valve member 24 will seek an intermediate position to balance the forces acting on opposite sides of the valve face 24b whenever there is a pressure differential across the valve face 24b with the flapper 54 at an intermediate position. This will result in a true mixing condition since both cold fluid flowing through the inlet opening 16 and hot fluid flowing through the inlet opening 18 will flow into the outlet opening 20 with the exact proportion being dependent upon the exact position of the valve member 24 relative to the valve seats 16a and 18a. By varying the sizes of the inlet nozzle 46 and the outlet nozzle 48, the mixing valve 10 can be provided such that the valve member 24 is normally "open," normally "closed," or balances at any desired intermediate position.

In the preferred embodiment, the flapper nozzle servovalve 42 is of a type in which the flapper 54 penetrates into the central control port 44 by means of a welded metal diaphragm. As a result, the coils 52 are accessible for replacement without breaking into the fluid loop and the mixing valve 10 requires no hermetic electrical connectors to be utilized.

With the present invention, the mixing valve is characterized by an extremely simple construction utilizing only a single major moving part. The simplicity of the valve renders it extremely reliable, particularly when the valve member 24 and the piston 28 are formed of an engineering plastic, such as that sold under the trademark Torlon, which provides low friction sliding surfaces and is compatible with a fluid such as water and with stainless steel components for the housing 12. Accordingly, the mixing valve is well suited for use as a temperature control bypass valve in a pumped fluid cooling loop for a thermal cooling system.

While in the foregoing there has been set forth a preferred embodiment of the invention, it is to be understood that the invention is only to be limited by the spirit and scope of the appended claims.

I claim:

1. A mixing valve, comprising:
   a housing defining a valve chamber having a pair of inlet openings and an outlet opening;
   a valve support mounted to said housing and extending into said valve chamber between said inlet openings;
   a valve member slidably mounted on said valve support within said valve chamber for movement between said inlet openings;
   said valve member and said valve support defining an actuation chamber therebetween; and
   means for supplying a fluid pressure signal to said actuation chamber for biasing said valve member toward one of said inlet openings during operation.

2. The mixing valve as defined by claim 1 wherein said inlet openings are disposed in substantial axial alignment with oppositely facing valve seats thereabout.

3. The mixing valve as defined by claim 2 wherein said valve support is rigidly mounted to said housing and extends axially through one of said inlet openings to a point intermediate said oppositely facing valve seats.

4. The mixing valve as defined by claim 3 wherein said valve support includes a piston disposed in a fixed position at said point intermediate said oppositely facing valve seats upon which said valve member is slidably mounted.

5. The mixing valve as defined by claim 4 wherein said valve support further includes an axially extending stem integrally associated with said piston and rigidly mounted to said housing to maintain said piston in said fixed position.

6. The mixing valve as defined by claim 4 wherein said actuation chamber is between said piston and said valve member, a spring being seated on said piston in said actuation chamber to act against said valve member, said spring comprising said means associated with said actuation chamber for biasing said valve member toward one of said inlet openings.

7. The mixing valve as defined by claim 3 wherein said valve member has oppositely facing valve surfaces conforming to and adapted to engage said oppositely facing valve seats.

8. A temperature control bypass valve for a fluid in a fluid circulation system, comprising:
   a housing defining a valve chamber having a pair of inlet openings and an outlet opening, said inlet openings being disposed in substantial axial alignment with oppositely facing valve seats thereabout, said inlet openings carrying said fluid at different temperatures for mixing to provide said fluid at a predetermined temperature downstream of said outlet opening;

a valve support rigidly mounted to said housing and extending into said valve chamber to a point between said inlet openings, said valve support extending axially through one of said inlet openings to a point intermediate said oppositely facing valve seats;

a valve member slidably mounted on said valve support within said valve chamber for axial movement between said inlet openings, said valve member having oppositely facing valve surfaces conforming to and adapted to engage said oppositely facing valve seats;

said valve member and said valve support defining an actuation chamber therebetween; and means for supplying a fluid pressure signal to said actuation chamber for biasing said valve member toward one of said inlet openings during operation.

9. The temperature control bypass valve as defined by claim 8 wherein said valve support includes a piston disposed in a fixed position at said point intermediate said oppositely facing valve seats upon which said valve member is slidably mounted and further includes an axially extending stem integrally associated with said piston and rigidly mounted to said housing to maintain said piston in said fixed position.

10. The temperature control bypass valve as defined by claim 9 wherein said means for supplying said fluid pressure signal comprises a fluid conduit adapted to carry said fluid pressure signal through said stem to said actuation chamber.

11. The temperature control bypass valve as defined by claim 10 including fluid temperature responsive means for controlling said fluid pressure signal supplied to said actuation chamber.

12. The temperature control bypass valve as defined by claim 11 wherein said fluid temperature reponsive means includes a flapper nozzle servovalve, said flapper nozzle servovalve including a central control port having an inlet nozzle and an outlet nozzle, said central control port also communicating with said fluid conduit, said inlet nozzle communicating with fluid carried to one of said inlet openings and said outlet nozzle communicating with a drain line.

13. The temperature control bypass valve as defined by claim 12 wherein said flapper nozzle servovalve includes a replaceable dry coil accessible externally of said housing and includes a flapper extending into said central control port between said inlet and outlet nozzles.

14. The temperature control bypass valve as defined by claim 9 further including a spring seated on said piston in said actuation chamber for biasing said valve member toward said one of said inlet openings, said valve member facing said one of said inlet openings such that said fluid passing through said one of said inlet openings acts against said valve member opposite the direction of biasing of said spring and said fluid pressure signal.

* * * * *